Patented Dec. 11, 1928.

1,695,081

UNITED STATES PATENT OFFICE.

GEORGE BARSKY, OF NEW YORK, N. Y., AND FREDERICK W. FREISE, OF PALMYRA, NEW JERSEY, ASSIGNORS TO AMERICAN CYANAMID COMPANY, OF NEW YORK, N. Y.

FERTILIZER.

No Drawing.     Application filed June 25, 1923. Serial No. 647,764.

The invention relates to a method of making a new fertilizer material possessing very beneficial properties, and having an exceedingly high available nitrogen content. In addition, the nitrogenous compounds are easily decomposed and readily lend themselves to assimilation in the soil, and a consequent absorption by the plant rootlets.

The object of this invention is to render available the most inactive and stubborn proteins, and closely related compounds, and so combine them with other and available nitrogeneous materials, that the resulting product will serve as a valuble plant food. As an additional object, we desire to render available the nitrogen of materials of so stable a nature that years would be required for the soil bacteria to decompose them. It is also our aim to convert the cheapest forms of nitrogen into those which bring the highest price as fertilizer ingredients.

With these and other objects in view, the invention consists in the novel steps and combination of steps constituting the process, and in the reconditioned and combined materials comprising the product, all as will be more fully hereinafter described, and particularly pointed out in the claims.

As one example of our invention, we mix two hundred (200) pounds of leather scrap with four hundred (400) pounds of sulphuric acid of 50° Bé. The whole is stirred until it becomes homogeneous and the leather is dissolved. We then add two hundred (200) pounds of calcium cyanamid and stir in. The resulting mass is then allowed to set, and a porous solid material is obtained. The temperature reaches about 212° F. during the reaction.

As the changes taking place are dependent largely upon the proper methods of mixing, the order in which the materials are added, and the nature of the materials, themselves, great care must be exercised in carrying out the invention, if the best results are to be obtained. Owing to the varying properties of the commercial materials going to make up the low grade inactive proteins, used by fertilizer manufacturers, the exact mode of operation is slightly different in each instance.

In the choice of materials, many factors have to be considered, but the controlling ones are initial cost, and percentage of nitrogen. The ease with which the acid attacks leather, hair, wool waste, fish scrap, skins, felt, feathers, etc., which may be termed industrial waste, is much the same, and the chemical products resulting are practically identical.

When garbage is used, there is more uncertainty as will readily be understood, considering the varying nature of the material. While it is true that there are small differences in the ease with which the acid attacks the materials, due often to physical properties and varying percentages of fat, these differences are never of a serious nature. An instance of this is hair, which normally is dissolved readily by the acid, but is slightly retarded, due to matting and to the presence of fat.

The question of cost is dependent solely upon the locality, and the supply and demand of each material. The simplicity of our process, and the simple requirements as regards factory installation, make it possible for us to so locate the plants, and to operate such a number that advantage can be taken of existing and artificial differences in market prices.

Outside of initial cost, the question of protein content, is the all-important consideration. The freight costs of both the initial and finished products are dependent on it.

In addition to the materials enumerated above, acid fish scrap is important and is highly thought of by fertilizer manufacturers. It has a high nitrogen content, and is uniform in composition.

Although peat has a low nitrogen contact, it might be treated in the same way. If any appreciable amounts of sand, clay or other inorganic materials are present, its value is decidedly less. Peat also performs another function in that it retains moisture in the soil and conserves plant food so that it may be absorbed by the plants instead of being carried away by the rains.

In the choice of materials we are not limited to the insoluble protein carrying industrial waste materials enumerated in this specification, as there are a great number of other cheap substances not previously used, owing to the unavailable condition of the protein, that we may employ.

There are also certain other materials, such as linseed meal, cottonseed meal, etc., that are occasionally used when no other markets are open to them.

In the past, many methods have been suggested for rendering available the nitrogen of refractory materials, such as enumerated above, and many processes have been commercially developed. Of these, probably the most common is a steam digestion, or boiling with water, or dilute acid, under pressure. This necessitates in every case a very expensive installation, and the cost of up-keep is prohibitive. In addition, the handling costs are high.

In the process which we have invented, and which is herein described, very simple appliances will suffice. This makes it possible to locate fertilizer plants close to the raw materials, to put up plants at little cost, and have a number of small units located, where best to obtain the raw materials and dispose of the finished products.

When leather scrap and like industrial waste materials are treated with acid, they are hydrolyzed, and a complex series of compounds result. Among these, and constituting a very large proportion, are the amino acids. They are valuable and efficient plant foods, but in the past, the many methods proposed for obtaining them, have been involved and expensive. The colloidal, highly acid glue-like material resulting on treating leather, etc., with sulphuric acid, cannot be used as a fertilizer in its original condition, and if it is treated with phosphate rock, the valuable nitrogenous constituents on precipitation from the acid tend to lose considerable of their value. It has never been suggested in the past, that this glue-like colloidal mass of acid and leather, etc., might be employed in the manufacture of a marketable, nitrogenous fertilizer. We have now discovered that this is possible and that a high grade, highly nitrogenous material results, when calcium cyanamid, in proper proportions, is added to the mass. It is not, as might at first be supposed, a simple mixture, or blending of two nitrogenous materials, but is a chemical combination, in which the products resulting from the hydrolysis of the leather scrap, etc., unite with the free cyanamid, resulting from the action of sulphuric acid, on calcium cyanamid and form a nitrogenous plant food of greater fertilizer value than either, alone. The amino acids and similar products of the insoluble protein hydrolysis, chemically combine with the free cyanamid, resulting from the splitting up of calcium cyanamid in the presence of sulphuric acid. This reaction is of general application and also follows when feathers, fish scales, wool waste, felt, shoddy waste, garbage, acid fish scrap, etc., are being treated.

Too much stress cannot be placed on the advantages of our process in respect to the saving in complicated and expensive equipment. A steam treatment or digestion under pressure is not necessary. The resulting saving of cost of fuel alone is an important item.

As is well known, crude calcium cyanamid carries about twenty (20%) per cent of free lime, which is objectionable, when the material is being handled. In our present process, the trouble is entirely overcome, as not only the free lime, but also the calcium, in the cyanamid is changed into sulphate. Thus, not only the troublesome features of crude cyanamid are overcome, but the comparatively valueless proteins of leather, etc., are changed into the most valuable forms.

In the above invention, many modifications would suggest themselves to those skilled in the art. Therefore, we do not wish to be limited to the above disclosures, except as may be required by the claims.

We claim:—

1. A method of producing a fertilizer material which comprises bringing inactive proteins into combination with free cyanamid in presence of an acid; substantially as described.

2. A method of producing a fertilizer material, which comprises bringing the proteins of nitrogenous organic industrial waste into combination with free cyanamid in presence of sulphuric acid; substantially as described.

3. A method of producing a fertilizer material, which comprises hydrolyzing insoluble proteins and combining them with free cyanamid; substantially as described.

4. A method of producing a fertilizer material, which comprises treating compounds containing water insoluble proteins with a hydrolyzing agent, also capable of decomposing lime nitrogen, and liberating free cyanamid, and thereby uniting the hydrolyzed proteins with the free cyanamid; substantially as described.

5. A method of producing a fertilizer material which comprises treating nitrogenous organic industrial waste, with sulphuric acid and after disintegration and hydrolysis, adding sufficient calcium cyanamid to bring the mass to the consistency of a dry powder; substantially as described.

6. A method of producing a fertilizer material, which comprises treating nitrogenous organic industrial waste with sufficient acid to cause hydrolysis and in addition unite with the calcium in an amount of calcium cyanimid sufficient to dry up the mass and produce a marketable product; substantially as described.

7. A method of producing a fertilizer material, which comprises treating nitrogenous organic industrial waste with sufficient sulphuric acid to bring about hydrolysis and, in addition, decompose sufficient calcium cyanamid to supply free cyanamid to unite with the products of hydrolysis, and on mixing, produce a dry marketable product; substantially as described.

8. A method of producing a fertilizer material, which comprises subjecting materials carrying water insoluble proteins to the action of sulphuric acid and later to the action of calcium cyanamid, both being in such proportions that the nitrogen in the resulting mass will be substantially water soluble; substantially as described.

9. A method of producing a fertilizer material, which comprises hydrolyzing water insoluble protein in sulphuric acid and adding calcium cyanamid in such amounts as to afford free cyanamid sufficient to unite with the hydrolyzed protein; substantially as described.

10. A method of producing a fertilizer material, which comprises treating a water insoluble protein with sulphuric acid under conditions best suited to bring about a maximum amount of hydrolysis and adding a suffisient amount of calcium cyanamid to be decomposed by the free acid, and in such amount that a dry granular mass will result; substantially as described.

11. A method of producing a fertilizer material which comprises adding calcium cyanamid to an acid mass of hydrolyzed protein, in such proportions as to produce a dry granular material; substantially as described.

12. A method of producing a fertilizer material which comprises bringing a plurality of nitrogenous materials not immediately available into contact with an acid and thereby rendering the nitrogenous materials available, and allowing the products of the reaction to interact; substantially as described.

13. A method of producing a fertilizer material which comprises bringing two organic nitrogenous materials not immediately available, into an available condition and causing them to interact, through the instrumentality of an organic acid; substantially as described.

14. As a new fertilizer constituent, hydrolyzed protein associated with free cyanamid; substantially as described.

15. As a new fertilizer constituent amino-acids in chemical combination with free cyanamid; substantially as described.

16. As a new fertilizer constituent hydrolyzed protein in chemical combination with free cyanamid the nitrogenous product being substantially water soluble; substantially as described.

17. As a new fertilizer material hydrolyzed protein, combined with free cyanamid; and associated with calcium sulphate; substantially as described.

18. As a new fertilizer material hydrolyzed nitrogenous organic industrial waste, in combination with free cyanamid; and associated with calcium sulphate; substantially as described.

19. A method of producing a fertilizer material which comprises mixing about 200 parts of nitrogenous organic industrial waste with about 400 parts of sulphuric acid of about 50° Bé., and then adding about 200 parts of calcium cyanamid.

In testimony whereof we affix our signatures.

GEORGE BARSKY.
FREDERICK W. FREISE.